US006446986B1

(12) United States Patent
Ames

(10) Patent No.: US 6,446,986 B1
(45) Date of Patent: Sep. 10, 2002

(54) SHOPPING CART WITH FLEXIBLE, EXPANDABLE WALLS

(76) Inventor: Marc L. Ames, 14 Estate Rd., Hillsborough, NJ (US) 08844

( * ) Notice: Subject to any disclaimer, the term of this patent is extended or adjusted under 35 U.S.C. 154(b) by 0 days.

(21) Appl. No.: 09/805,015

(22) Filed: Mar. 12, 2001

(51) Int. Cl.[7] .............................................. B62D 39/00
(52) U.S. Cl. ............................. 280/33.997; 280/79.2; 280/47.34
(58) Field of Search .................. 280/33.991, 33.997, 280/79.11, 79.2, 79.3, 47.35, 47.34

(56) References Cited

U.S. PATENT DOCUMENTS

| | | | | |
|---|---|---|---|---|
| 2,020,766 A | * | 11/1935 | Brown | 220/9.3 |
| 3,276,786 A | * | 10/1966 | Olander | 280/33.997 |
| 5,630,602 A | * | 5/1997 | Vanderslice et al. | 280/47.17 |
| 5,671,933 A | * | 9/1997 | Tucker | 280/47.19 |
| 5,769,435 A | * | 6/1998 | Nishida | 280/33.991 |
| 5,915,723 A | * | 6/1999 | Austin | 280/43 |
| 6,032,965 A | * | 3/2000 | Sabounjian | 280/47.35 |
| 6,079,777 A | * | 6/2000 | Simmons et al. | 108/157.17 |
| 6,328,329 B1 | * | 12/2001 | Smith | 280/33.991 |

FOREIGN PATENT DOCUMENTS

JP          404173557    *  6/1992

OTHER PUBLICATIONS

John Marko, "Plastics", May 23, 1994, 1 page, polethylene definition available on the World Wide Web.*
matweb.com, "Overview–Low Density Polyethylene (LDPE), Sheet/Profile extrusions", 2 pages.*
matweb.com, "Overview–Linear Medium Density Polyethylene (LMDPE), Film", 2 pages.*
matweb.com, "Natural Rubber, Vulcanized", 2 pages.*

* cited by examiner

*Primary Examiner*—Jack Lavinder
*Assistant Examiner*—Xuan Lan Nguyen
(74) *Attorney, Agent, or Firm*—Kenneth P. Glynn, Esq.

(57) ABSTRACT

The present invention is a shopping cart for manually transporting goods from one location to another, it includes a bottom frame with a plurality of wheels connected thereto, a vertical support connected to the bottom frame and extending upwardly therefrom to support a basket. The basket has a rigid bottom, an open top, a front and a back, and two side walls. Each of the side walls includes at least one top member connected to the front and the back, and further includes a flexible, elastically expandable member connected to the top member and elsewhere to the basket. The flexible, elastically expandable member may be open mesh or sheet, and may be a partial panel. Optionally the flexible, elastically expandable material may be included in the front of the cart.

14 Claims, 3 Drawing Sheets

SHOPPING CART WITH FLEXIBLE, EXPANDABLE WALLS

BACKGROUND OF THE INVENTION

1. Field of the Invention

The present invention relates to shopping carts, and more particularly shopping carts with flexible, elastically expandable sidewall components, to enable the carts to expand from and contract to its original volume when overloaded by goods placed in and removed from the carts.

2. Information Disclosure Statement

Shopping carts have been known for decades and are typically made of wire and tubular metal, plastic molded or extruded pieces or combinations thereof. They have baskets made of non-flexible, non-elastically expandable materials (plastic, metal, or combination) and basically present a rigid structure with a fixed volume. None have been provided with expandable volume capabilities based on flexible structures which expand and contract.

Laundry carts do not have nestability features as do shopping carts, but offer flexible side walls in the form of flexible canvas or plastic "bags".

Notwithstanding the prior art, the present invention is neither taught nor rendered obvious thereby.

SUMMARY OF THE INVENTION

Shopping carts have been designed to perform the transport of foodgoods and other products which may be hard or solid (non-amorphous) and need to both be protected from and protective of their contents. They must support, protect and at least partially contain goods in a manner much more stringent than a rolling pallet, a laundry cart or other transporter. They typically include nestability with a hinged backwall, open structure for visibility and air circulation, and require complex manueverability. Also necessary is ease for removing goods at a checkout counter taking into account the cart size, the use and the typical checkout counter.

The present invention is directed to shopping carts for manually transporting goods from one location to another, which uniquely provide the user with expandable capacity to receive more goods than a shopping cart of comparable size. The present invention shopping cart includes a bottom frame; a plurality of wheels connected to and located below the bottom frame; a vertical support connected to the bottom frame and extending upwardly therefrom to support a basket. The basket is located above the vertical support and connected thereto. The basket has a rigid bottom, an open top, a back, a front and two side walls. Each of the side walls include at least one top member connected to the front and the back, and further includes a flexible, elastically expandable member connected to the top member and connected elsewhere to the basket. In some embodiments, the basket front has a flexible, elastically expandable member.

The flexible, elastically expandable member of each side wall is connected to the front, the back, and the bottom of the basket and to its top member. The top member of the sidewalls may be flexible itself, but is preferably rigid.

In some embodiments, the side walls further includes a rigid wall portion connected to the basket and to the flexible, elastically expandable member, e.g. half of the wall is standard rigid construction, and half is flexible, although completely flexible side walls are preferred. The flexible, elastically expandable member of the side walls, and of the front, where applicable, is a material of elastomeric material, rubber, flexible polymer or mixture, and may be sheet, strip, mesh or otherwise. The elastically expandability feature is one which must be recoverable repeatedly, i.e. repeated expanding and contracting.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Figure 1:
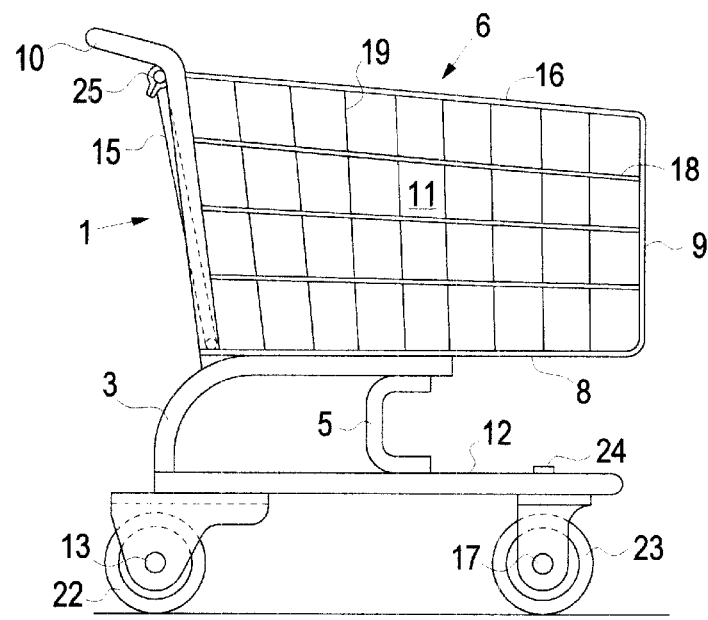
FIGS. 1 and 2 show a side and back view of a prior art shopping cart.
Figure 2:
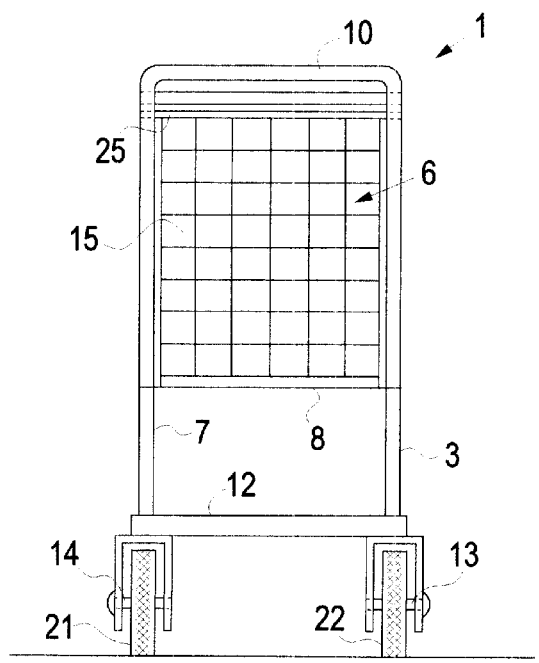

FIG. 1 and 2 illustrate a side view and a back view, respectively, of a prior art shopping cart 1. Cart 1 includes a bottom frame 12 and a plurality of wheels such as wheels 21, 22 and 23. These wheels are supported by axles such as axles 13, 14 and 17, with front wheels being rotatable in a vertical axis as indicated for example, by rotation member 24.

Shopping cart 1 also has a vertical support, in this case for vertical support components as illustrated by components 3, 5 and 7. These vertical support components are connected to bottom frame 12 and are also connected to basket 6, as shown. Basket 6 has a back 15, a front 9, a bottom 8 and a left and right side wall exemplified by side wall 11. There is a top member 16, vertical wires such as wire 19 and thicker horizontal wires such as wire 18. Back 15 is hinged at its top by hinge rod 25 so that it may swing in to accommodate partial nesting. FIG. 1 and 2 are stylized representations of a typical shopping cart, but does not show true tapering which would be necessary at the basket and at the bottom frame to permit nesting. The nesting feature itself is not a point of novelty of the present invention, but would be a feature of the present invention shopping carts.

Figure 3:
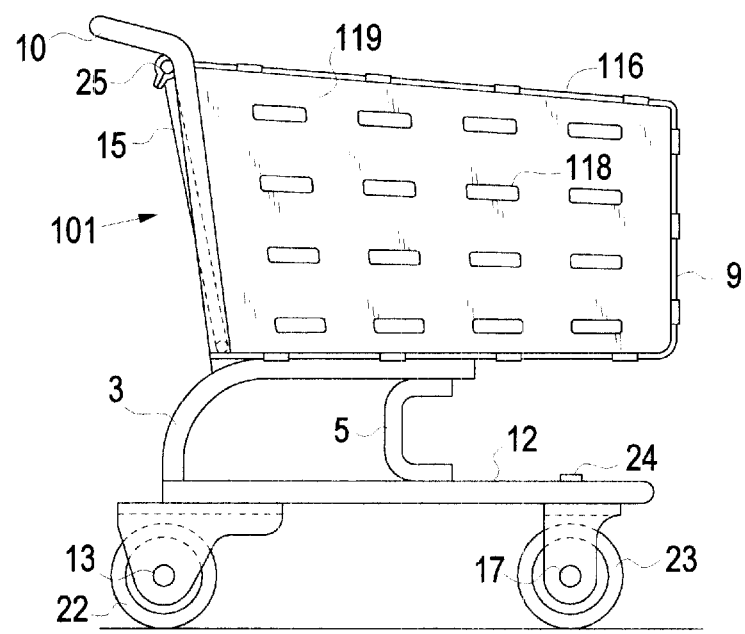
FIG. 3 shows a side view of one present invention shopping cart embodiment with flexible, elastically expandable single component side walls.

FIG. 3 shows a side view of 1 embodiment of the present invention. Here, present invention cart 101 has parts which are shown in FIG. 1 identically numbered and those parts need not be repeated for the discussion of the present invention with respect to FIGS. 3 through 6.

Shopping cart 101 in FIG. 3 has a right side wall 119 (and an identical left side wall, not shown) which is formed of an open mesh flexible, expandable material, such as flexible, expandable rubber or polymer, elastomer or synthetic material, or composite material. These could include inner tube type of rubbers, rubber-synthetic blends, fabric weaves such as in heavy duty ace bandages, embedded material having parallel, non woven reinforcement threads in a cast or extruded expandable material.

As can be seen in FIG. 3, there are a plurality of "mail slot" cutouts to enhance visibility and elastically expendability.

Figure 4:
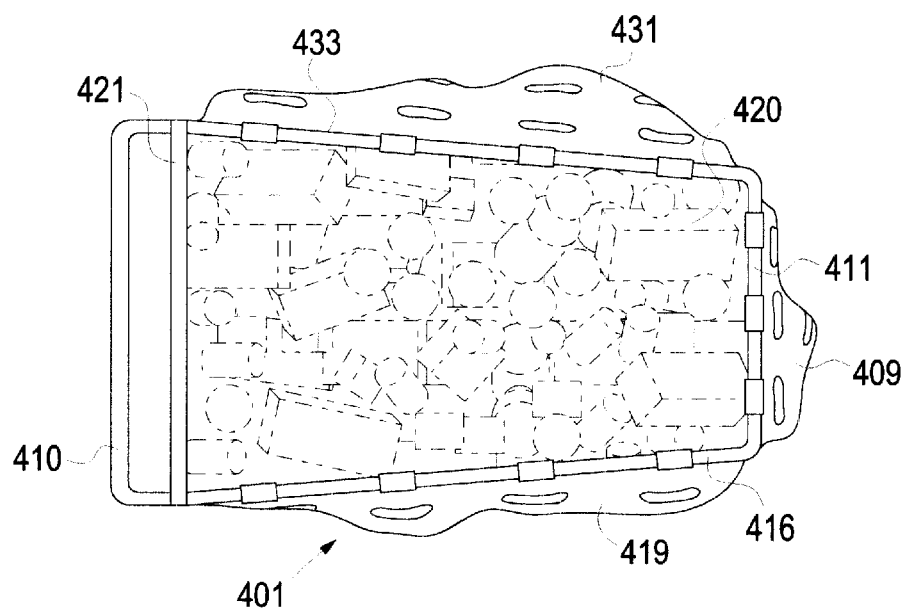
FIG. 4 shows a top view of another embodiment of a present invention shopping cart having flexible, elastically expandable side walls and front, shown with a cart full of goods in an expanded mode.
Figure 5:
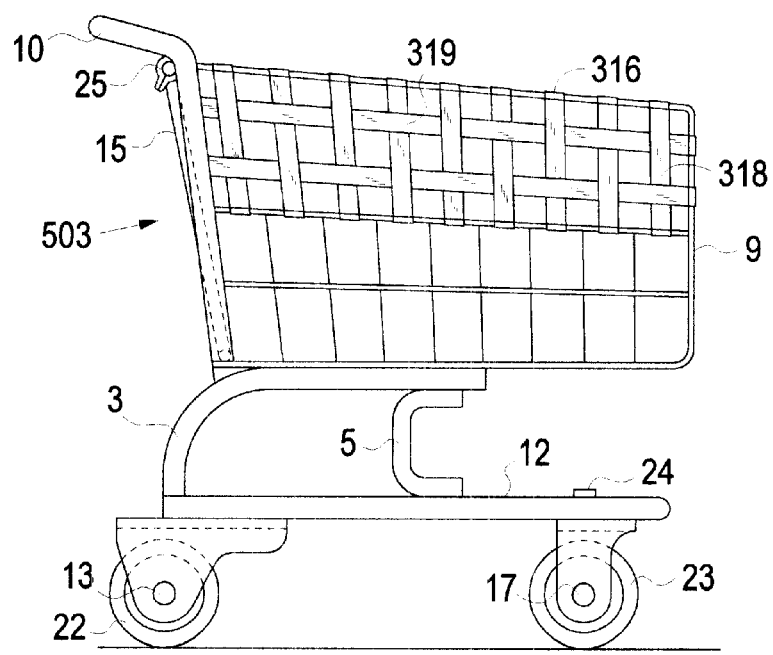
FIG. 5 shows another embodiment of a present invention shopping cart with a partial section of the side walls having expandable material; and, FIG. 6 shows a front view of a present invention shopping cart having a continuous sheet expandable front panel.

FIG. 4 shows a top view of another present invention shopping cart 401, in its packed state.

Cart 401 is similar to cart 101 of FIG. 3 except that it also has an expandable front which is not part of the FIG. 3 device. Thus cart 401 includes a front 411 and a side top members 416 and 433 and back 421, along with handle 410. There are flexible side walls 419 and 431 and flexible front 409. Groceries 420 have filled cart 401 and pushed side walls 419 and 431 and front 409 to an expanded state. When groceries 420 are removed, side walls 419 and 431 and front 409 will contract to their vertical rest position. FIG. 3 shows another present invention cart 503 with partial height flexible side walls. Cart 503 has an upper half to each side wall which contains interwoven flexible strips such as vertical strip 318 and horizontal strip 319. An identical opposite side wall not shown, is also included. This permits expanded upper portions of the sides of cart 503.

Figure 6:
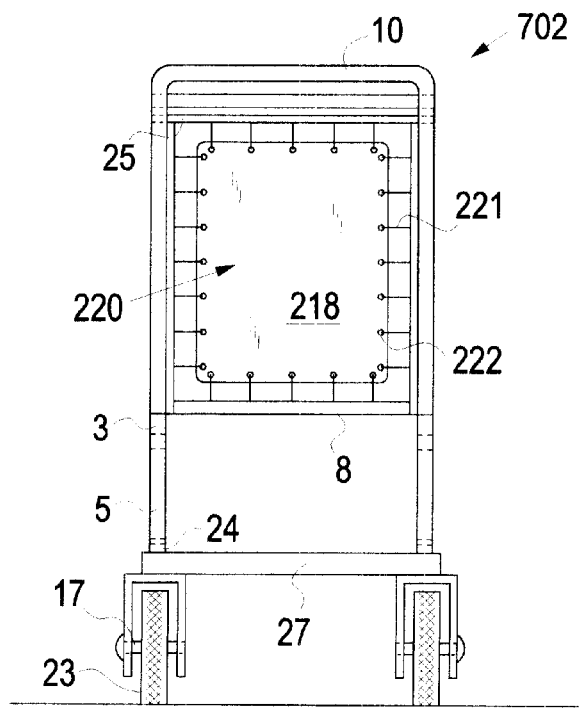

FIG. 6 shows a front view of cart 702 with identical parts to shopping cart 1 of FIG. 1 except that front 220 includes a single solid sheet of expandable material 218 which has hook attachments 222 4 hooks such as hook 221. This could be any type of expandable, contractible tear resistant (durable) material and could even be made of spandex-type material.

Obviously, numerous modifications and variations of the present invention are possible in light of the above teachings. It is therefore understood that within the scope of the appended claims, the invention may be practiced otherwise than as specifically described herein.

What is claimed is:

1. A shopping cart for manually transporting goods from one location to another, which comprises:
   a.) a bottom frame;
   b.) a plurality of wheels connected to and located below said bottom frame;
   c.) a vertical support connected to said bottom frame and extending upwardly therefrom to support a basket;
   d.) a basket located above said vertical support and connected thereto, said basket having a rigid bottom, an open top, a front and a back, and two side walls, each of said side walls including at least one top member connected to said front and said back, and further including a flexible, elastically expandable member connected to said top member and elsewhere to said basket wherein each of said side walls further includes a rigid wall portion connected to said basket and to said flexible, elastically expandable member.

2. The shopping cart of claim 1 wherein said flexible, elastically expandable member is connected to said front, said back, and said bottom of said basket.

3. The shopping cart of claim 1 wherein said flexible, elastically expandable member is a sheet of elastomeric material.

4. The shopping cart of claim 2 wherein said flexible, elastically expandable member is a sheet of elastomeric material.

5. The shopping cart of claim 1 wherein said flexible, elastically expandable member is a flexible open mesh.

6. The shopping cart of claim 2 wherein said flexible, elastically expandable member is a flexible, elastically expandable open mesh.

7. The shopping cart of claim 1 wherein said top member of each of said walls is a rigid top member.

8. A shopping cart for manually transporting goods from one location to another, which comprises:
   a.) a bottom frame;
   b.) a plurality of wheels connected to and located below said bottom frame;
   c.) a vertical support connected to said bottom frame and extending upwardly therefrom to support a basket;
   d.) a basket located above said vertical support and connected thereto, said basket having a rigid bottom, an open top, a back, and two side walls, each of said side walls including at least one top member connected to said front and said back, and further including a flexible, elastically expandable member connected to said top member and elsewhere to said basket, and said basket also having a front with a flexible, elastically expandable member, wherein each of said side walls further includes a rigid wall portion connected to said basket and to said flexible, elastically expandable member.

9. The shopping cart of claim 8 wherein said flexible, elastically expandable member of each of said side walls is connected to said front, said back, and said bottom of said basket.

10. The shopping cart of claim 8 wherein said flexible, elastically expandable member is a sheet of elastomeric material.

11. The shopping cart of claim 9 wherein said flexible, elastically expandable member is a sheet of elastomeric material.

12. The shopping cart of claim 8 wherein said flexible, elastically expandable member is a flexible, elastically expandable open mesh.

13. The shopping cart of claim 9 wherein said flexible, elastically expandable member is a flexible, elastically expandable open mesh.

14. The shopping cart of claim 8 wherein said top member of each of said walls is a rigid top member.

* * * * *